United States Patent [19]
Atkins

[11] Patent Number: 4,756,349
[45] Date of Patent: Jul. 12, 1988

[54] QUICK CONNECT/DISCONNECT OIL DRAINING APPARATUS

[76] Inventor: John Atkins, 3542 N. Albany, Chicago, Ill. 60618

[21] Appl. No.: 5,266

[22] Filed: Jan. 20, 1987

[51] Int. Cl.$^4$ .............................................. B65B 3/04
[52] U.S. Cl. .................................. 141/383; 141/114; 141/313; 141/346; 184/1.5; 251/149.1
[58] Field of Search ................................ 141/382–386, 141/346–362, 10, 68, 114, 313–317; 251/149.1, 149.8, 148; 184/1.5

[56] References Cited

U.S. PATENT DOCUMENTS

| | | | |
|---|---|---|---|
| 3,273,585 | 9/1966 | Patch | 251/149.1 |
| 3,727,638 | 4/1973 | Zaremba et al. | 184/1.5 |
| 3,731,717 | 5/1973 | Potash | 141/353 |

*Primary Examiner*—Houston S. Bell, Jr.
*Attorney, Agent, or Firm*—Hill, Van Santen, Steadman & Simpson

[57] ABSTRACT

A disposable oil draining apparatus for a vehicle comprises a normally-closed valve having a threaded end which replaces the normal drain plug in the vehicle oil pan. A valve actuator is releasably connected to the valve by way of a spring-loaded latch and is in communication with a disposable plastic bag which serves as a drain reservoir.

15 Claims, 1 Drawing Sheet

QUICK CONNECT/DISCONNECT OIL DRAINING APPARATUS

BACKGROUND OF THE INVENTION

1. Field of the Invention

The present invention relates to apparatus for draining oil from a motor vehicle and is particularly concerned with oil draining apparatus in which at least a portion of the apparatus is disposable.

'Description of the Prior Art

Oil changing apparatus normally found in service stations and quick-change and lubrication stations are known in the art in which a large funnel is telescoped to a position adjacent the oil pan of a vehicle to direct the used oil into a reservoir after the oil pan plug has been removed.

Various devices have been made for home use which generally constitute a reservoir having a sloped surface for receiving and directing the used oil into the reservoir. These are generally portable plastic devices having a sealing plug which may be removed to empty the reservoir for later use.

It is also known in the art to provide, in place of the oil pan plug, a valve having an actuating lever. This valve permits discharge of the used oil without the necessity of removing a plug by simply moving the lever.

In all of the art mentioned above, the used oil flows freely through the air to some type of funnel device. The service station devices generally prevent or minimize splashing; however, the devices made for home use tend to create splashing which requires later clean up of the area.

SUMMARY OF THE INVENTION

The object of the present invention is to provide a disposable oil collection apparatus and includes the attendant object of providing an oil collection apparatus in which splashing and clean up is eliminated.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
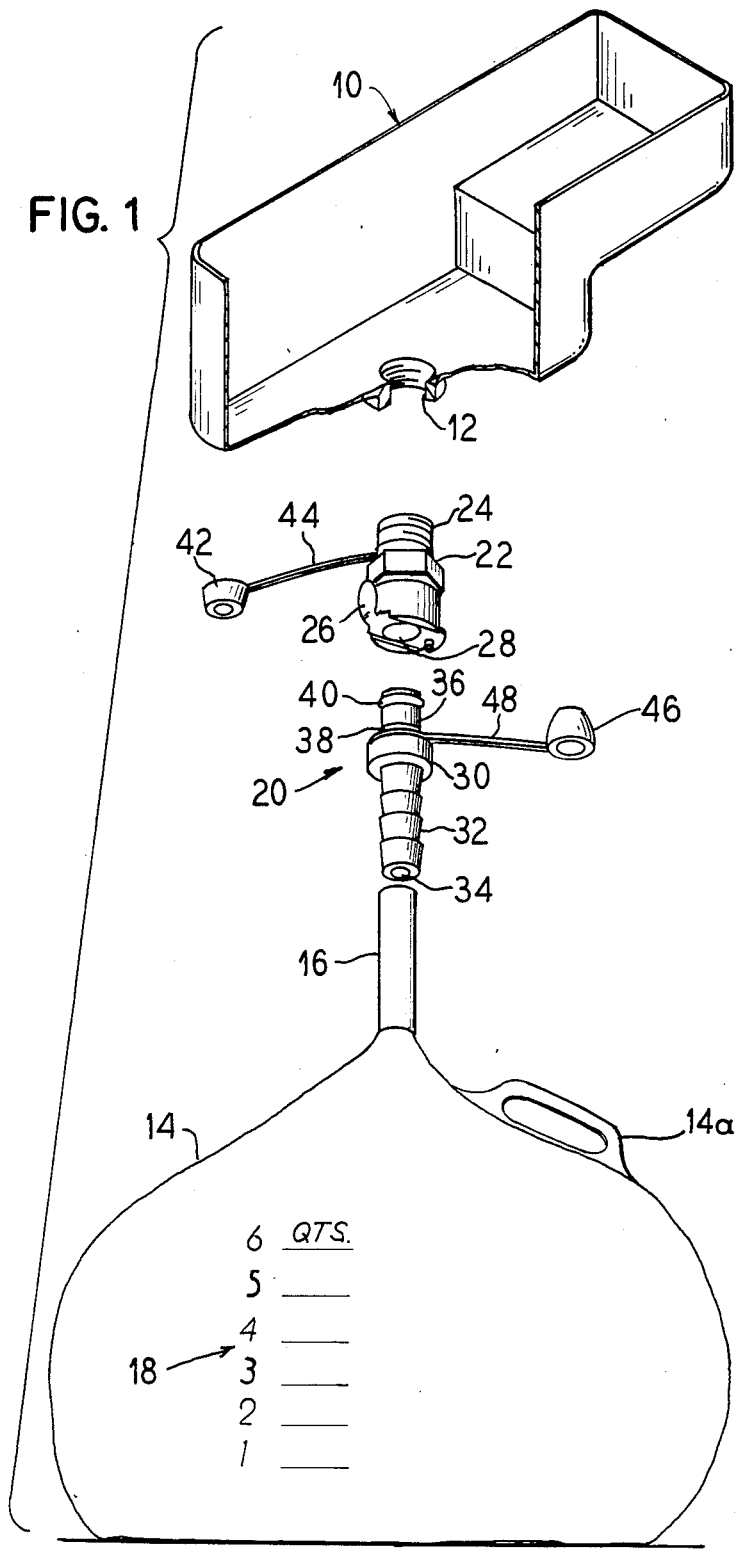
FIG. 1 is an exploded view of oil collection apparatus according to the invention.

Referring to the drawing, an automobile auto pan 10 is illustrated in a fragmentary sectional view. The oil pan 10 includes a threaded aperture 12 which normally receives a removable threaded plug for sealing the oil pan and for permitting discharge of the used oil upon removal thereof.

A disposable bag 14, such as a plastic bag (preferably flexible), serves as a reservoir for receiving the oil. The bag 14 includes a neck 16 as an oil inlet. The bag may also be provided with graduations, such as illustrated at 18, to indicate the amount of oil drained. Depending upon the size of the bag, and with the knowledge of the oil capacity of the vehicle, such a bag may be used more than once.

A valve structure is generally illustrated at 20 as comprising two major components, namely a valve 22 and a valve actuator 30.

The valve 22 comprises a threaded portion 24 to be received in the threaded aperture 12 of the oil pan 10. The valve 22 also comprises a spring-loaded latch 26 which includes an aperture 28 which is generally aligned, and upon actuation by plugging in the actuator 30, is aligned, with a passageway (not shown) through the valve 22. The valve 22 also includes, internally and also not shown, the actual valve structure.

Figure 2:
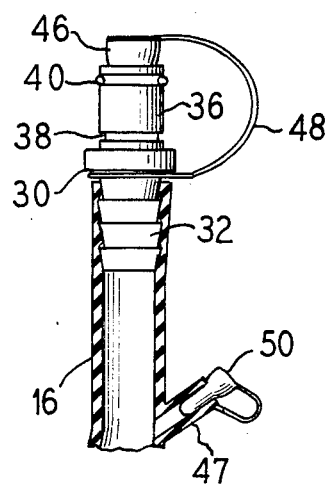
FIG. 2 is an enlarged view of a seal and latch structure and shows a variation of the reservoir in the form of a vent.

The valve actuator 30 comprises a barbed end 32 to be frictionally received within the hollow neck 16 of the bag 14 (see FIG. 2). The actuator 30 also includes an open passageway 34 for communication with the passageway in the valve 22. The actuator 30 further comprises an actuating section 36 including a peripheral groove 38 and an automatically sealing O-ring 40.

Suitable valves include the PMC series ⅛" Flow Acetal Delrin ® quick coupling valve and the LC 220 ¼" Flow Brass Series (chrome plated) quick coupling valve manufactured by Colder Products Co. 2367 University Avenue, St. Paul Minn. The Acetal Delrin valve has a rated operating temperature in the range of −40° F. to 180° F. and the brass valve has a rated operated temperature of 180° F. with no minimum operating temperature. It has been determined, however, that both the brass and Delrin can be operational at above 250° F. In the event an increased flow rate is desired, the inside diameter of the valve parts may be enlarged.

Oil is drained from the oil pan 10 by moving the latch 26 radially inwardly by plugging the actuating section 36 completely through the aperture 28 and automatically releasing the latch 26 as the edge of the aperture 28 locks into the peripheral groove 38.

After the used oil has completely drained, the latch 26 is operated to release the edge of the aperture 28 from the peripheral groove 38 and the actuating section 36 is unplugged from the valve 22.

After draining and removal of the actuator 30, a plug 42, tethered to the valve 22 by way of a strand 44, may be inserted a short distance into the aperture 28 as a protection against dust and the like, but without extending sufficiently for it to open the valve. The strand 44 and plug 42 are preferably integral with an annular washer disposed around the threaded end 24.

By the same token, a sealing cap 46, tethered to the valve actuator 30 by strand 48, may be employed to seal the actuating section 36 so that the bag may be sealed for disposal or, if there is sufficient capacity, for later use.

According to the present invention, at least the bag 14 is disposable; however, with the sealing cap 46 in place on the actuating section 36, the bag 14 and the valve actuator 30 may together form a disposable unit.

Since the oil being transferred to the bag 14 may be very hot, it is preferred that the bag be provided with effective insulation. In the embodiment illustrated, a hand or thumb hole 14a is provided adjacent the top of the bag, away from the oil. The bag may of course alternatively, or additionally be provided with an outer insulation layer or be formed of an insulating foam material.

If the reservoir is a rigid structure and air must be displaced, a vent 47 and a sealing plug 50 may be provided.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Oil draining apparatus for a vehicle which has an oil pan, including a threaded drain opening, comprising:
   a reservoir for receiving used oil from the oil pan, said reservoir including an oil inlet;
   a valve actuator including first and second ends and a passageway therebetween, said first end received in said oil inlet; and
   a normally-closed valve, including a threaded first end to be threaded into the drain opening, and the second end including an actuating opening for receiving and automatically sealing said second end of said valve actuator therein to open said valve automatically when said actuator is received.

2. The oil draining apparatus of claim 1, wherein:
   said reservoir is a closed disposable flexible plastic bag.

3. The oil draining apparatus of claim 1, wherein:
   said reservoir comprises a hollow tubular neck; and
   said first end of said valve actuator comprises a barbed section frictionally received in said hollow tubular neck.

4. The oil draining apparatus of claim 1, wherein:
   said second end of said valve actuator comprises a peripheral groove; and
   said valve comprises a latch to be received in said groove to hold the valve actuator and valve together during draining.

5. The oil draining apparatus of claim 1, and further comprising:
   a plug for plugging said actuating opening when oil is not being drained.

6. The oil draining apparatus of claim 5, and further comprising:
   a tether connecting said plug to said valve.

7. The oil draining apparatus of claim 1, and further comprising:
   a sealing cap for sealing said second end of said valve actuator.

8. The oil draining apparatus of claim 7, and further comprising:
   a tether connecting said cap to said valve actuator.

9. Oil draining apparatus for a vehicle which has an oil pan, including a drain opening, comprising:
   a reservoir for receiving used oil from the oil pan, said reservoir including an oil inlet;
   a valve actuator including first and second ends and a passageway therebetween, said first end connected to and in communication with said oil inlet; and
   a normally-closed valve including a first end to be received in and attached to the drain opening, and a second end including an actuating opening and means for releasably receiving and automatically sealing said second end of said valve actuator in said actuating opening for opening and closing said valve.

10. The oil draining apparatus of claim 9, wherein:
    said second end of said valve actuator comprises sealing means for sealing said second end within said actuating opening.

11. Oil draining apparatus for a vehicle which has an oil pan, including a drain opening, comprising:
    a disposable plastic bag for receiving used oil from the oil pan, said disposable plastic bag including a hollow tubular inlet neck;
    a valve actuator including first and second ends and a passageway therebetween, said first end including a tethered barbed section frictionally received in said neck; and
    a normally-closed valve including a first end received in the drain opening and in communication therewith, and a second end including an actuating opening for communication with said first end, including means for releasably receiving and automatically sealing said second end of said valve actuator to open and close said valve.

12. An oil draining system for a vehicle which has an oil pan with a drain opening, comprising:
    a reservoir for receiving drained oil, said reservoir comprising an oil inlet; and
    a quick connect/disconnect valve means including the first part for connection to the oil pan via the drain opening, and a second part for connection to said reservoir via said oil inlet and releasably connectable and automatically sealable to said first part to establish and break fluid communication between the oil pan and said reservoir.

13. The oil draining system of claim 12, wherein:
    said reservoir comprises a vent opening.

14. The oil draining system of claim 13, wherein:
    a sealing means is provided for said vent opening.

15. Oil draining apparatus for a vehicle which has an oil pan, comprising:
    a reservoir for receiving the oil; and
    channelling means for completely enclosing oil flow between the oil pan and said reservoir, said channelling means comprising quick connect/disconnect valve means including a first part for connection to the oil pan via the drain opening, and a second part for connection to said reservoir via said oil inlet and releasably connectable and automatically sealable to said first part to establish, close and break oil flow between the oil pan and said reservoir.

* * * * *